L. H. HORNER.
SPINNING AND TWISTING MACHINE.
APPLICATION FILED JULY 15, 1913.
1,230,300.
Patented June 19, 1917.
3 SHEETS—SHEET 1.
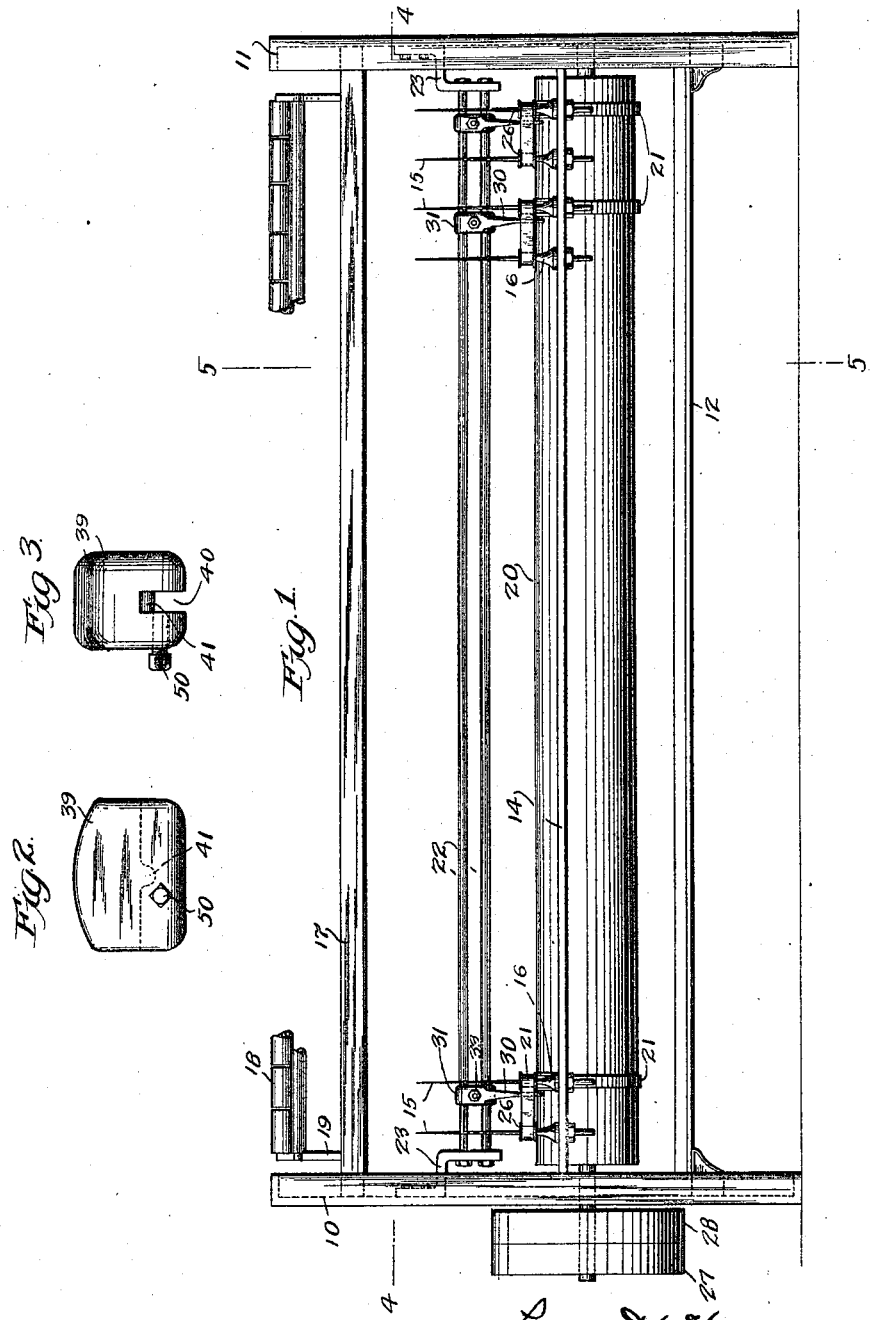

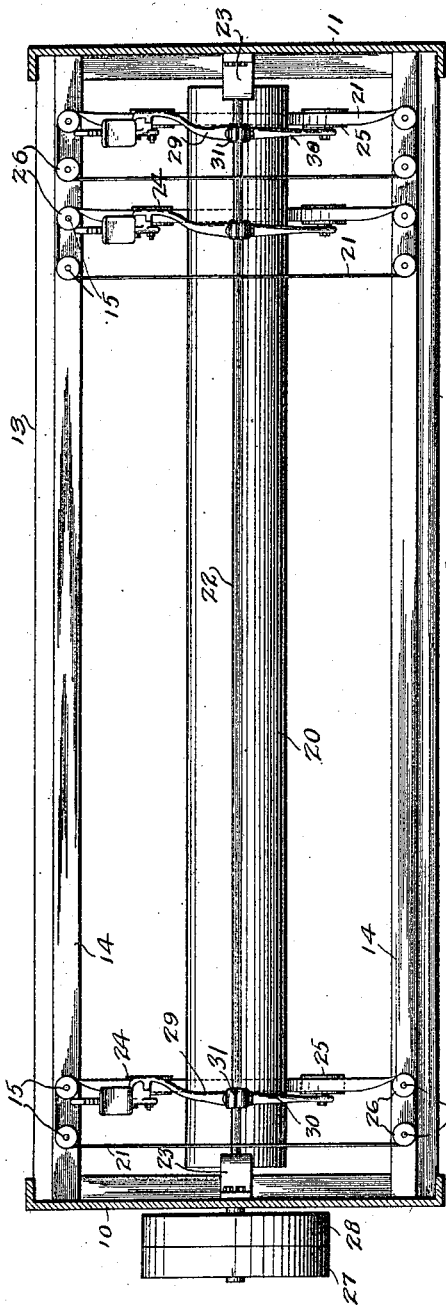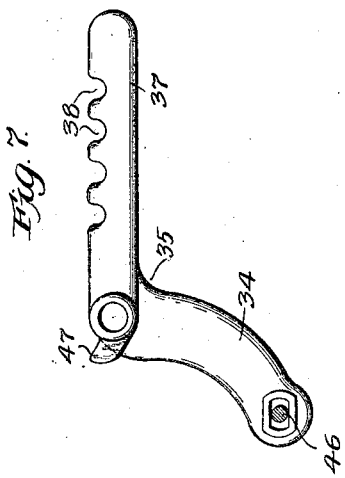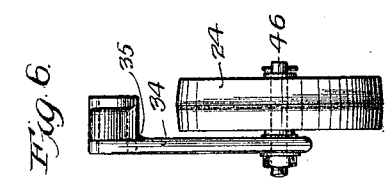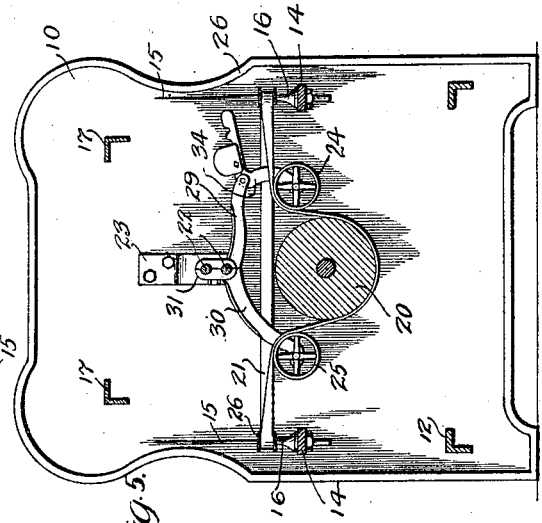

L. H. HORNER.
SPINNING AND TWISTING MACHINE.
APPLICATION FILED JULY 15, 1913.
1,230,300.
Patented June 19, 1917.
3 SHEETS—SHEET 3.
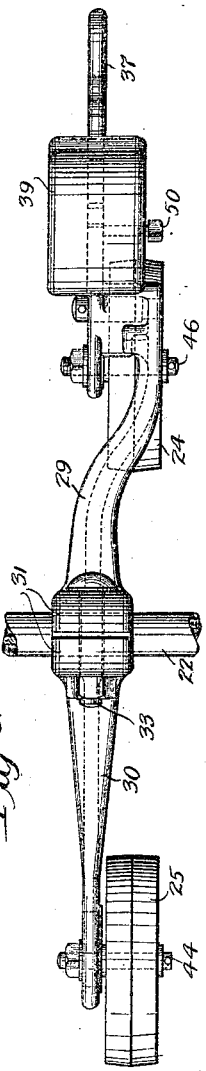
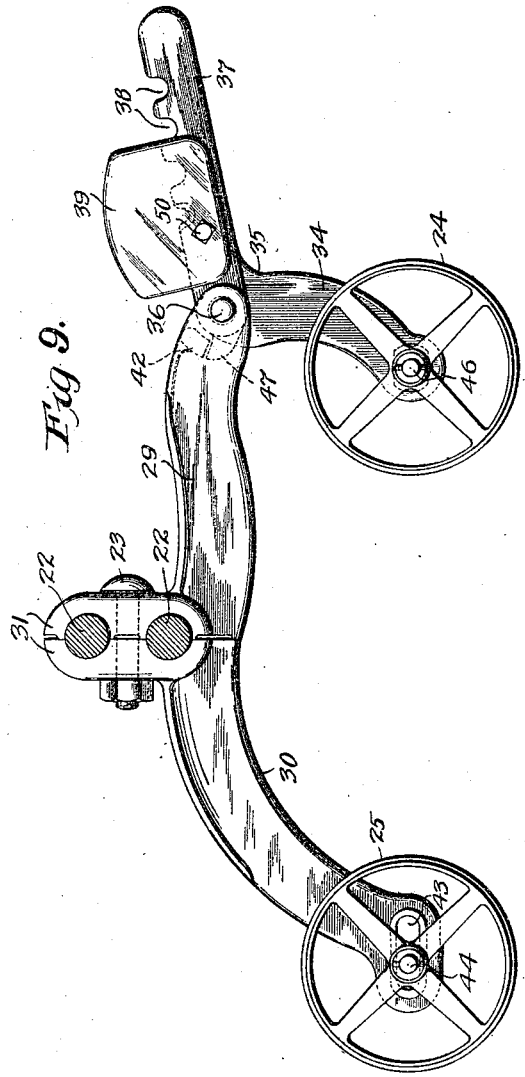
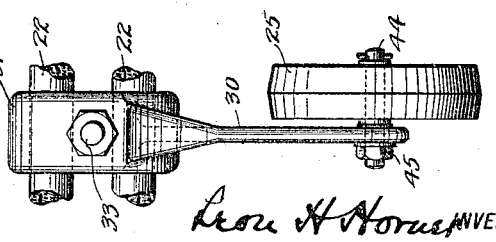

UNITED STATES PATENT OFFICE.

LEON H. HORNER, OF WHITINSVILLE, MASSACHUSETTS, ASSIGNOR TO THE WHITIN MACHINE WORKS, OF WHITINSVILLE, MASSACHUSETTS, A CORPORATION OF MASSACHUSETTS.

SPINNING AND TWISTING MACHINE.

1,230,300.      Specification of Letters Patent.      Patented June 19, 1917.

Application filed July 15, 1913. Serial No. 779,074.

*To all whom it may concern:*

Be it known that I, LEON H. HORNER, a citizen of the United States, residing in Whitinsville, in the county of Worcester and State of Massachusetts, have invented the following-described Improvements in Spinning and Twisting Machines.

This invention provides a spindle drive for spinning or twisting frames with tension regulating means for the spindle bands which is effective for its purpose and adapts itself economically and without complication to general spinning frame construction, being designed more especially for flat band or tape drives wherein a single tape drives spindles at opposite sides of the frame. The invention includes a tape drive having the novel features of construction and combinations of elements hereinafter described in connection with the drawings, showing the preferred embodiments, and more particularly set forth in the appended claims.

In the drawings:

Figure 1 is a partial front elevation of a spinning machine showing the application of the invention;

Fig. 2 is a side view of a detail used in construction;

Fig. 3 is an end or front view of the same;

Fig. 4 is a longitudinal sectional view of a spinning machine, taken on a line corresponding to 4—4 of Fig. 1;

Fig. 5 is a transverse sectional view taken on line 5—5 of Fig. 1;

Fig. 6 is a front elevation of a tension pulley and the tension lever on which it is mounted;

Fig. 7 is a side view of the tension lever;

Fig. 8 is a plan view of the band guiding and tensioning means complete on its mountings;

Fig. 9 is a side elevation of the same; and

Fig. 10 is an end view showing the same construction.

The frame of the machine comprises the usual ends 10, 11, connected by the beams 12, 13, the bolster rails 14 supporting the bolsters 16 of the spindles 15, and the roller beams 17 supporting the drawing rolls 18 and their stands 19, all of which may be of ordinary construction and therefore not necessary to be described herein.

A driving cylinder or drum 20, provided with fast and loose pulleys 27, 28, for belt connection, extends lengthwise of the frame and constitutes a common driving element for the two rows of spindles 15 throughout the length of the frame. This drum can be located centrally of the machine, midway between the rows of spindles, or it may be off center if desired, and in the present case is banded to the spindles by flat bands or tapes 21, each of which is utilized in the present case to drive four spindles, that is to say, a pair at each side of the frame. Inasmuch as the tape when thus arranged has contact with only 90° of each spindle whirl, it is important that the tension thereon be kept constant and equal on each whirl, so that each spindle will receive a uniform driving effect, and the yarn on each spindle will be spun with a uniform degree of twist and equal to all of its neighbors.

In attaining such uniformity I provide tape-guiding and tensioning means, and a support therefor, which is located directly over the driving cylinder and extends longitudinally of, and through the interior of the frame so as to be supported by the end or intermediate uprights, in a simple and convenient manner and to be common to the tensioning devices of all the bands. In the construction shown, it results from this relation that the support is also central with respect to the sides of the frame, although it might be otherwise according to the position of the drum. As illustrated this longitudinal, over-cylinder support 22 is formed of two parallel rods or bars, one above the other in a vertical plane, and fixed at their ends to brackets 23 of simple construction bolted or screwed to the uprights, which arrangement by its location not only avoids complication with respect to other parts of the machine and the lifter-motion, but also adapts the support to accommodate the tension pulleys 24, 25, in substantially symmetrical arrangement at opposite sides of the drum. Each driving tape passes from the side of the drum upwardly and over one pulley, then around the whirls 26 of a pair of spindles on one side, then directly across the machine to the opposite pair, and thence over the other pulley and downwardly to the drum, so that one transverse course of the belt is straight and the other guided around the pulleys and cylinder. The provision of pulleys 24, 25, on opposite sides of the drum, renders the course of each tape symmetrical with respect to the opposite rows of spindles and so insures the same conditions on both sides of the machine, as will presently appear.

The supporting of the pulleys from the longitudinal girder member 22 is formed by laterally-projecting arms 29, 30, which extend in generally opposite directions, and downwardly to such extent as will provide a desired contact between the drum and its tapes. In the particular construction illustrated each arm is formed as a part of a two-piece yoke 31, the halves or parts of which are suitably grooved on their proximate faces and bolted together against the rods, as indicated at 33, each pair of arms being thereby independently adjustable lengthwise of the frame. At the same time the clamped faces of the yoke arms coöperate, as strut members, with the two vertically disposed rods and convert the same into a girder well adapted to resist the load of the tension mechanism, although of extremely light construction, as will be evident.

The pulleys 24 are journaled on pivots 46 in the lower ends of the depending arms 34 of the bell-crank tension levers 35, which latter are fulcrumed at the outer ends of the lateral arms 29 and adjustably weighted on their other arms, 37, by means of weights 39, or equivalent means. The weighted arms are notched at frequent intervals, as shown at 38, and the weights are slotted, as shown at 40, and also provided each with an internal tooth 41 to engage the notches and thus hold the weights against displacement under the vibration produced by the running of the tape. In addition, a set screw 50 is provided for clamping the weight to the lever arm. As shown in the plan views, the ends of the lateral arms 29 are offset so as to support the bell-cranks and their guide pulleys in the same vertical planes as the pulleys 25 at the other side of the drum. Excessive movement of the levers and weights when the tapes are removed is prevented by the stop lugs 47 formed on the levers in position to contact with abutments 42 on the supporting arms. These coöperating limit stops hold the pulleys 24 in convenient position for connection with the tapes, when new tapes are to be applied, but normally they are kept out of engagement by the tension of the bands, as will be observed.

The lateral arms 30 which support the guide pulleys 25, on the opposite side, are curved or inclined downward to bring the axes of these pulleys to substantially the same level as the axes of the pulleys 24, and at about the same distance from the cylinder; and in order that this relation may be secured with substantial accuracy irrespective of variations in the lengths of the bands, the pulleys 25 are provided with means of adjustment relatively to the cylinder and the pulleys 24. To this end a laterally extending slot 43 is formed in the extremity of each of the arms 30, to hold the pivot stud 44, which may be shifted in the slot and held in the appropriate position by a nut 45.

According to their adjustment, the counterweights hold the pulleys 24 against their respective tapes each with a constant pressure, and preserve a uniform driving effect upon each of the four spindles, and manifestly the weights can be set so that the tension on all of the tapes in the frame will be equal. At the same time the symmetrical disposition of the opposite guide pulleys provides that the drum may be rotated in either direction according to the direction of twist desired, without producing a slack stretch adjacent to either of the four spindles; the slack stretch will in any event be located between the drum and one of the guide pulleys. While springs might be used in place of the weights, the latter are preferred by reason of the greater inertia they present.

I claim:

1. A spinning frame having rows of spindles at opposite sides, a driving cylinder disposed between them, a tape trained about the cylinder and about one or more spindles of each row, and a support extending longitudinally over said cylinder, in combination with tape-tensioning and guiding means mounted on such support and comprising a tape pulley on each side of the cylinder, both pulleys coöperating with the same tape.

2. In a spinning frame, a driving cylinder, a horizontal girder structure over the cylinder, band-guiding and tensioning devices supported from said girder structure at opposite sides of the cylinder, and a spindle band in contact with the cylinder and with spindles at both sides of the frame and also trained on the band-guiding and tensioning devices at both sides of the cylinder.

3. In a spindle drive for spinning machines, the combination with the spindles, a driving cylinder, and a spindle band trained on said cylinder and on spindles at opposite sides of the frame, of a girder structure over the cylinder, and tensioning devices mounted on the girder comprising band guides at opposite sides of the cylinder, one of such guides being urged toward the tape, which is trained on both of the guides.

4. In a spindle drive for spinning machines, the combination with the spindles, a driving cylinder, and a spindle band engaging the cylinder and spindles on opposite sides of the frame, of a longitudinal support over the cylinder, oppositely-projecting arms on said support, a fixed band-guide mounted on one of said arms, and a yieldingly pressed band-guide and tensioning device on the other arm.

5. In a spinning frame having spindles, a driving cylinder and spindle bands, a longitudinal support over the driving cylinder, arms projecting laterally from said support in both directions, band guides carried by said arms at opposite sides of the cylinder, and band-guide-urging means for imparting tension to the bands.

6. In a spindle drive for spinning machines, the combination with the spindles, a driving cylinder, and a spindle band engaging the cylinder and spindles on opposite sides of the frame, of a longitudinal support over the cylinder, arms projecting at opposite sides of said support, a band guide fixed to one of said arms with provision for adjustment relatively to the cylinder, and a yieldable band guide and tensioning device on the other arm.

7. A spinning frame having two rows of spindles, a driving cylinder intermediate the rows, and a plurality of bands, each of which is in driving engagement with the cylinder and with spindles at both sides of the frame, in combination with a longitudinal support over the cylinder, pairs of oppositely projecting arms independently adjustable lengthwise of said support, and band guides supported by said arms at opposite sides of the cylinder, the guides at one side being fixed with capacity for independent adjustment relatively toward and from the cylinder and the guides at the other side being yieldingly supported.

8. In a spindle drive for spinning frames, a driving cylinder, spindles at opposite sides of the frame, band guides at opposite sides of the cylinder, and suitable band-guiding-urging means for imparting tension to the band, in combination with said band which passes under the cylinder, over one of the band guides, then around spindle whirls at one side of the machine, then straight across to spindle whirls at the opposite side of the machine, then over the other band guide and back under the cylinder.

9. In a spindle drive for spinning frames, a driving cylinder, two pairs of vertical spindles at opposite sides of the frame, a fixed guide pulley at one side of the cylinder, a yieldingly-urged tension pulley at the opposite side of the cylinder, and a band which passes around the whirls of both pairs of spindles and one course of which passes over both pulleys and under the cylinder, the other course passing straight across over the cylinder from one side of the machine to the other.

10. In a spinning frame, the combination with the frame ends, rows of spindles, a driving cylinder and bands, of a longitudinal support over the cylinder comprising rods one above the other, brackets supporting the same from the frame ends, strut members clamped to said rods, fixed arms projecting laterally from said strut members, and band-tensioning devices carried by said arms.

11. In a spinning frame, the combination with the frame ends, rows of spindles, a driving cylinder and spindle bands, of a longitudinal support over the cylinder, a two-part yoke having means whereby it adjustably clamps the support and formed with oppositely-projecting arms, and band-guiding and tensioning devices carried by said arms at opposite sides of the cylinder.

In testimony whereof, I have signed this specification in the presence of two witnesses.

LEON H. HORNER.

Witnesses:
 OSCAR L. OWEN,
 CHESTER C. LAMB.

Copies of this patent may be obtained for five cents each, by addressing the "Commissioner of Patents, Washington, D. C."